United States Patent Office 2,761,655
Patented Sept. 4, 1956

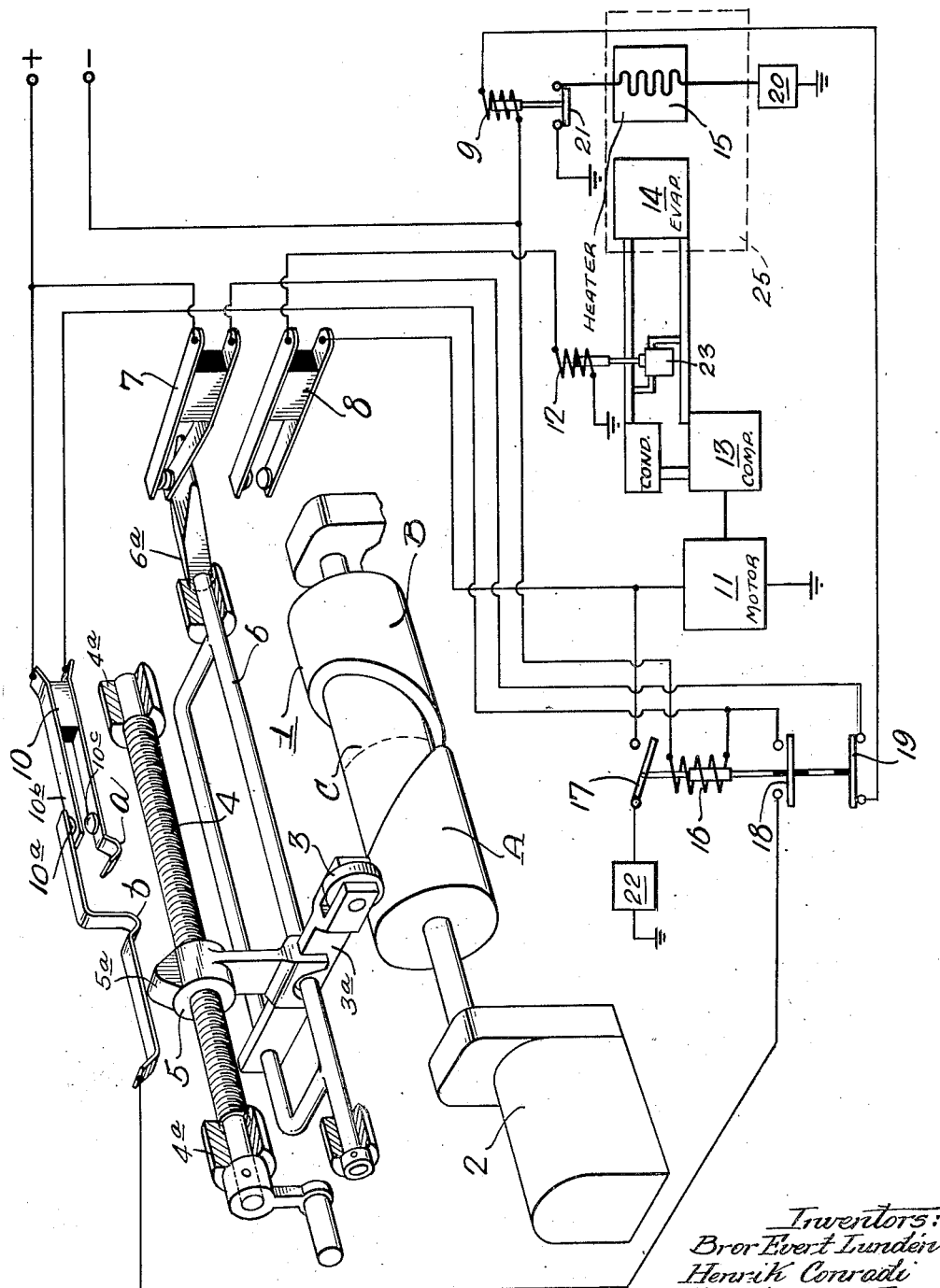

2,761,655
REGULATING DEVICE

Bror Evert Lundén, Angby, Henrik Conradi, Appelviken, Nils Erik Birger Larsson, Finspong, and Timo Airas, Vasteras, Sweden, assignors to A B Svenska Flaktfabriken, Stockholm, Sweden, a corporation of Sweden Application April 23, 1952, Serial No. 283,868

5 Claims. (Cl. 257—9)

The present invention relates to a control device for maintaining conditions in a work space at a given level regardless of the level of the conditions outside the space.

The invention is characterized by the provision of two oppositely-acting units, one for effecting conditioning in one sense, for example, raising the level of conditions in the work space and the other for effecting conditioning in the opposite sense, for example, lowering the level. The overall effect of each unit is regulated by actuating the unit at a maximum output for a given proportion of a given cycle and at a minimum or zero output for the remainder of the cycle. This method of regulation obviates the necessity for mechanism for producing continuous variation in the output of the units.

The invention is described herein as applied to a system for maintaining a given temperature level by means of heating and refrigerating units, but the invention is not limited to such application and it may be applied to control humidity or other similar conditions. The invention provides means for regulating the level both manually as well as automatically and it is, therefore possible to predetermine the level of the conditions in the work space.

A primary object of the present invention, therefore, is to provide a novel regulating mechanism which affords a gradual regulation of cooperating oppositely-acting units between a maximum conditioning in one sense and a maximum conditioning in the opposite sense.

Another object of the present invention is to provide a mechanism of the stated type which is of simple construction and is entirely efficient and effective in operation and use.

These and other objects of the invention and the various features and details of the construction and operation thereof are more fully set forth hereinafter with reference to the accompanying drawing in which the figure is a diagrammatic view in perspective of a regulating mechanism made in accordance with the present invention showing schematically the electrical connections to the control devices for the oppositely-acting units, for example, heating and refrigerating units.

The invention contemplates a positively driven cylinder having its surface formed with raised and low portions. The ratio of the length of the raised portion to the length of the low portion about the circumference of the cylinder progresses from a maximum at one end to a minimum in the center and then to a maximum at the other end. A guide roller or follower is mounted on a lever adjacent the cylinder to engage the same and follow the high and low portions thereof. Electric circuit means is provided having switches responsive to the relative position of the roller on the cylinder to actuate the control devices of the oppositely-acting units. When the roller is on the high portion of the cylinder, the control devices afford maximum output of the respective units, and when the roller is on the low portion, the control devices afford minimum output of the respective units.

The circuit also includes switch means responsive to the longitudinal position of the roller relative to the cylinder. When the roller is at one end of the cylinder, the switch means renders one of the units operable and the other unit inoperative, and when the roller is at the other end of the cylinder, the one unit is rendered inoperative and the other unit is rendered operable. Thus, when the roller is disposed adjacent one end of the cylinder, the output from the apparatus comprises the maximum output of the one unit. As the roller is displaced toward the center, the overall output of the one unit is diminished until the roller reaches the center at which point the output is at a minimum or zero. Upon further longitudinal movement of the roller, the one unit is rendered inoperative and the other unit operable. At the center, the other unit operates at minimum or zero output and as the roller progresses outwardly from the center, the output of the unit gradually increases until the roller reaches the extreme end of the cylinder where the output is at a maximum. Thus, it is seen that the invention provides continuous variation in output from the apparatus from a maximum conditioning in one sense to a conditioning in the opposite sense.

Referring now to the drawing, the control cylinder 1 is driven by a motor 2. The cylinder is formed with large and small diameters at locations along its length to form high and low portions on the cylinder. The high portions designated by the reference characters A and B are shaped as triangles having their apexes confronting one another in spaced relation adjacent the center C of the cylinder 1. Thus, the ratio of the circumferential lengths of the high portion to the low portion increases gradually from a minimum at the center C of the cylinder to a maximum at each outer end thereof. A roller or follower 3 is provided to engage on the cylinder 1 to control the electric circuit means more fully described hereinafter. To this end, the roller 3 is mounted on an arm 3a which is journalled for rotation with a shaft 6. A switch finger 6a is provided at the outer extremity of the shaft to actuate respectively the contacts 7 and 8. When the roller is on the high portion of the cylinder 1, the finger 6a will close the contacts 7 and when the roller is on the low portion of the cylinder, the finger 6a will close the contacts 8. These contacts operate to control the output of the heating and refrigerating units, as described more fully hereinafter.

In accordance with the invention, the roller 3 is operable to be displaced longitudinally of the cylinder 1. To this end, a yoke 5 embraces the lever 3a and is provided adjacent its upper extremity with a threaded aperture. A screw shaft 4 is threaded through the aperture in the yoke 5 and is journaled for rotation in the bushings 4a, 4a. As shown, the longitudinal position of the roller may be adjusted by simple rotation of the shaft 4. The shaft 4 may be rotated manually, for example, by a handle as shown, or the shaft may be rotated automatically by means responsive to the level of the conditions in the work space, in the present instance for example, a thermostat or the like. The yoke 5 is provided with a lug 5a which successively engages the tongues b and a as the roller 3 is displaced axially of the cylinder. When the lug engages the tongue b, contacts 10a and 10b are broken and when the lug engages the tongue a, contact between 10b and 10c is made. The contacts 10 control a relay 16 to render selectively operable the heating and refrigeration units.

When the roller is in the illustrated position at the left hand end of the cylinder 1, the refrigerating unit is rendered inoperative and the heating unit is rendered operable. To this end, the relay 16 is de-energized, opening the switches 17 and 18 and closing the switch 19 thereof. With the relay in this position, a heating unit 15 is energizable from a suitable source 20. The heating unit is energized when the roller is on the high portion A of the cylinder by means of a heating-control relay device 9. The relay 9 is energized by a circuit which runs from the positive side of the line through the contacts 7, the switch 19, and the relay 9 back to the negative side of the line. Energization of the relay 9 closes the switch 21 to complete the circuit for energizing the heater 15. When the roller 3 is engaged upon the low portion of the cylinder 1, the contacts 7 are broken to de-energize the relay 9 and, therefore, disconnect the heater 15.

As the yoke 5 is moved progressively to the right, the heater will be disconnected for a greater portion of each cycle of the cylinder 1 so that the overall heating effect will be gradually diminished. When the roller reaches the center line C of the cylinder 1, it will ride continuously on the low portion of the cylinder and maintain the heater 15 inoperative for the complete cycle.

Upon further rightward movement of the yoke 5, the lug 5a will engage the tongue a and close the contacts 10b and 10c. These contacts complete a circuit to the coil of the relay 16 and the relay will be energized. The circuit for this passes from the positive side of the line through the contacts 10b and 10c to the coil of the relay 16 and back to the negative side of the line. Energization of the relay closes the switches 17 and 18 and opens the switch 19. Closure of the switch 17 renders the refrigeration unit operable from its source 22, and the switch 18 completes a holding circuit to the relay coil 16 so that the relay will remain energized upon further longitudinal movement of the yoke 5. The holding circuit runs from the positive side of the line through the contacts 10b and 10a through the switch 18 to the relay coil 16 and back to the negative side of the line. The opening of the switch 19 renders the heating unit 15 inoperative.

The tongue a is in registry with the inner extremity of the high portion B of the cylinder 1, so that when the roller 3 engages the portion B, the refrigerating unit will be controlled. The refrigerating unit comprises a motor 11 driving a compressor 13 having inlet and outlet pipes 13a and 13b leading to an evaporator 14. A magnetically-controlled bypass valve device 23 is provided between the inlet and outlet of the compressor and is operable when open to shunt out the evaporator and reduce the output of the refrigerating unit to a minimum or zero. The valve 23 is normally closed and is operable to be opened by the contacts 8. It is noted that the compressor motor 11 runs continuously when the relay 16 is energized, but the refrigerating action is effective only when the coil 12 of the magnetic valve 23 is de-energized.

The coil 12 is de-energized when the roller 3 rides on the low portion of the cylinder 1, i. e., when the contacts 8 are closed by the finger 6a. The circuit for energizing the coil 12 is completed from the source 22 through the switch 17, the contacts 8 and the coil 12 to ground, and from ground, back to the source 22. When the finger 6a is elevated by the roller 3, the contacts 8 are opened and the coil 12 is de-energized to close the valve 23 and provide maximum output from the refrigerating unit. Thus, the location of the roller 3 longitudinally of the cylinder 1, will determine the proportion of the cycle during which the refrigerating unit is at a maximum output. Displacing the roller longitudinally of the cylinder to the right, gradually increases the output of the refrigerating unit until it obtains the desired level.

The present invention, therefore, provides means for gradually reducing the heat output from the heater 15 from a maximum to a zero level and then gradually increasing the refrigeration output of the refrigerating unit 11, 13, and 14 from zero to a maximum output. When it is desired to reverse the procedure, the yoke 5 is shifted to the left by means of the screw shaft 4. When the lug 5a engages the tongue b, the contacts 10a and 10b will be broken to open the holding circuit for the relay coil 16, and the relay is de-energized. Thus, there is a neutral zone between the portions A and B in which there is neither heating nor refrigeration. This neutral zone is determined not only by the spacing between the apexes of the triangular raised portions A and B but also by the location of the tongues a and b.

The invention has been particularly described as applied to means for heating and refrigerating a work space 25 but it is not limited to this application, since it may be applied to control humidity, pressure, or any other condition by means of units which act oppositely to change the level of the condition in the work space either positively or negatively.

While a particular embodiment of the invention has been herein illustrated and described, it is not intended to limit the invention to such disclosure, and changes and modifications may be made therein and thereto within the scope of the following claims.

What we claim is:

1. In a conditioning system having a first means for effecting conditioning in one sense, and a second means for effecting conditioning in the opposite sense; a regulating device comprising a cylinder having a low surface with two raised portions disposed longitudinally thereof, each of said raised portions having varying circumferential lengths at successive locations longitudinally of the cylinder, the circumferential length of each raised portion progressively changing toward a central zone of the cylinder, means to rotate said cylinder at a predetermined speed, follower means engaging said cylinder and movable longitudinally thereof, means for effecting longitudinal movement of said follower means, means controlled by the longitudinal positioning of said follower means in relation to the central zone of said cylinder for rendering only said first conditioning means operable when the follower means is on one side of the central zone and only the second conditioning means operable when the follower means is on the other side of the central zone, means operable by said follower means when it is at said one side of the central zone to control the operation of the first conditioning means according to the position of the follower means longitudinally of the raised portion, the engagement of said follower with said raised portion effecting maximum operation and the engagement of said follower with said low surface effecting minimum operation, to thereby effect conditioning in the one sense in proportion to the circumferential length of said raised portion, and means controlled by said follower means when it is at said other side of the central zone to control the operation of the second conditioning means according to the position of the follower means longitudinally of the latter raised portion, the engagement of said follower with said raised portion effecting maximum operation and the engagement of said follower with said low surface effecting minimum operation, to thereby effect conditioning in the opposite sense in proportion to the circumferential length of said raised portion.

2. In a conditioning system having a first means for effecting conditioning in one sense, and a second means for effecting conditioning in the opposite sense; a regulating device comprising a cylinder having a low surface with two raised portions disposed longitudinally thereof, each of said raised portions having varying circumferential lengths at successive locations longitudinally of the cylinder, the circumferential length of each raised portion being a maximum toward the end of the cylinder and progressively decreasing toward a central zone of the cylinder, means to rotate said cylinder at a predetermined speed, a roller engaging said cylinder and movable longitudinally thereof, means for effecting longitudinal movement of said roller, means controlled by the longitudinal positioning of said roller in relation to the central zone of said cylinder for rendering only said first conditioning means operable when the roller is on one side of the central zone and only the second conditioning means operable when the roller means is on the other side of the central zone, means operable by said roller when it is at said one side of the central zone to control the operation of the first conditioning means according to the position of the roller means longitudinally of the raised portion, the engagement of said roller with said raised portion effecting maximum operation and the engagement of said roller with said low surface effecting minimum operation, to thereby effect conditioning in the one sense in proportion to the circumferential length of said raised portion, and means controlled by said roller when it is at said other side of the central zone to control the operation of the second conditioning means according to the position of the roller means longitudinally of the latter raised portion, the engagement of said roller with said raised portion effecting maximum operation and the engagement of said roller with said low surface effecting minimum operation, to thereby effect conditioning in the opposite sense in proportion to the circumferential length of said raised portion.

3. A system according to claim 2 wherein said raised portions are generally triangular in shape, the apexes of the triangular raised portion confronting one another in spaced relation at opposite sides of the central zone of said cylinder to provide therebetween a neutral zone in which both of said conditioning means are controlled to effect minimum conditioning in each sense.

4. In a conditioning system having conditioning means for heating and conditioning means for cooling; a regulating device comprising a cylinder having a low surface with two raised portions disposed longitudinally thereof, each of said raised portions disposed longitudinally thereof, and having varying circumferential lengths at successive locations longitudinal of the cylinder, the circumferential length of each raised portion being a maximum toward the end of the cylinder and progressively decreasing toward a central zone of the cylinder, means to rotate said cylinder at a predetermined speed, a roller engaging said cylinder and movable longitudinally thereof, means for effecting longitudinal movement of said roller, switch means responsive to the longitudinal positioning of said roller in relation to the central zone of said cylinder, a double-acting relay controlled by said switch means for rendering only said heating means operable when the roller is on one side of the central zone and only the cooling means operable when the roller means is on the other side of the central zone, means operable by said roller when it is at said one side of the central zone to control the operation of the heating means according to the position of the roller means longitudinally of the raised portion, the engagement of said roller with said raised portion effecting maximum operation and the engagement of said roller with said low surface effecting minimum operation, to thereby effect heating in proportion to the circumferential length of said raised portion, and means controlled by said roller means when it is at said other side of the central zone to control the operation of the cooling means according to the position of the roller means longitudinally of the latter raised portion, the engagement of said roller with said raised portion effecting maximum operation and the engagement of said roller with said low surface effecting minimum operation, to thereby effect cooling in proportion to the circumferential length of said raised portion.

5. A system according to claim 4 wherein said conditioning means for cooling comprises a refrigerator having a compressor and wherein further said means controlled by the roller to control the operation of the conditioning means for cooling includes a magnetically operated valve in fluid communication with both the intake and exhaust passages of the compressor, said valve being closed when the roller is engaged with the corresponding raised portion of the cylinder, and open when the roller is engaged with the low surface of the cylinder.

References Cited in the file of this patent

UNITED STATES PATENTS

| | | |
|---|---|---|
| 1,743,545 | Helpbringer | Jan. 14, 1930 |
| 2,257,540 | Smellie | Sept. 30, 1941 |
| 2,291,840 | Spangenberg | Aug. 4, 1942 |
| 2,424,305 | Davis | July 22, 1947 |
| 2,502,967 | Leathers et al. | Apr. 4, 1950 |
| 2,612,026 | Hansen et al. | Sept. 30, 1952 |

FOREIGN PATENTS

| | | |
|---|---|---|
| 353,550 | Great Britain | July 30, 1931 |